(12) United States Patent
Coffey et al.

(10) Patent No.: US 6,982,843 B2
(45) Date of Patent: Jan. 3, 2006

(54) ASSEMBLY COMPRISING ADJUSTABLE HEAT FLUX MECHANISM FOR THERMALLY ASSISTED/THERMAL INFORMATION PROCESSING AND CONTROL

(75) Inventors: Kevin Robert Coffey, Morgan Hill, CA (US); Hendrik F. Hamann, Mohegan Lake, NY (US); Jan-Ulrich Thiele, Menlo Park, CA (US); Hemantha Kumar Wickramasinghe, Chappaqua, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 314 days.

(21) Appl. No.: 09/931,834

(22) Filed: Aug. 17, 2001

(65) Prior Publication Data

US 2003/0035234 A1    Feb. 20, 2003

(51) Int. Cl.
*G11B 5/02*    (2006.01)

(52) U.S. Cl. ........................................ 360/59

(58) Field of Classification Search .......... 360/46, 360/59, 97.02, 75, 13, 13.24, 13.26, 475, 360/294.7

See application file for complete search history.

(56) References Cited

U.S. PATENT DOCUMENTS

| | | | |
|---|---|---|---|
| 5,182,742 A * | 1/1993 | Ohmori et al. | 360/97.02 |
| 5,247,493 A * | 9/1993 | Kime et al. | 360/75 |
| 5,408,365 A * | 4/1995 | Van Doorn et al. | 360/46 |
| 5,596,555 A * | 1/1997 | Osato et al. | 360/59 |
| 6,050,722 A * | 4/2000 | Thundat et al. | 374/121 |
| 6,124,998 A * | 9/2000 | Kanegae | 360/68 |
| 6,404,713 B1 * | 6/2002 | Ueki | 369/47.53 |

OTHER PUBLICATIONS

Title: Piezo Film Sensors by Chatigny et al., Mar. 1999, Internet Address: http://www.sensormag.com/articles/0399/hot0399/main.shtml.*

* cited by examiner

*Primary Examiner*—David Hudspeth
*Assistant Examiner*—Glenda P. Rodriguez
(74) *Attorney, Agent, or Firm*—Townsend and Townsend and Crew LLP

(57) ABSTRACT

The invention discloses an assembly comprising an adjustable heat flux mechanism suitable for thermally assisted information processing and control. In one embodiment, the assembly discloses a directed energy source for heating a media, a temperature sensing element for measuring/inferring the temperature of the media, and a controller for mutually positioning the energy output by the directed energy source and the media for thereby controlling the power directed to the media in accordance with the temperature sensing element.

20 Claims, 3 Drawing Sheets

ASSEMBLY COMPRISING ADJUSTABLE HEAT FLUX MECHANISM FOR THERMALLY ASSISTED/THERMAL INFORMATION PROCESSING AND CONTROL

CROSS-REFERENCE TO RELATED APPLICATIONS

The instant application is related to U.S. application Ser. No. 09/408,946, filed Sep. 30, 1999 by Wickramasinghe et al. (IBM docket YO999-443); and, to U.S. application Ser. No. 09/512,248, filed Feb. 24, 2000 by Hamann et al. (IBM docket YOR9-2000-0099); and to U.S. application Ser. No. 09/540,726 filed Mar. 31, 2000 by Hamann et al. (IBM docket YOR9-2000-0180); and, to U.S. application Ser. No. 09/559,489, filed Apr. 27, 2000 by Hamann et al. (IBM docket YOR9-2000-0215); and to U.S. application Ser. No. 09/774,851, filed Jan. 31, 2001 by Wickramasinghe et al. (IBM docket YOR920010056); and to U.S. application Ser. No. 09/774,943, filed Jan. 31, 2001 by Wickramasinghe et al. (IBM docket YOR920010062); and to U.S. application Ser. No. 09/773,323, filed Jan. 31, 2001 by Wickramasinghe et al. (IBM docket YOR920010113); and to U.S. application Ser. No. 09/773,346, filed Jan. 31, 2001 by Wickramasinghe (IBM docket YOR920010114). All of these applications are co-pending, commonly assigned, and incorporated by reference herein. U.S. Pat. No. 6,233,206 by Hamann et al. (IBM docket YO999-504) is also incorporated by reference herein.

FIELD OF THE INVENTION

This invention relates to an assembly comprising an adjustable heat flux mechanism for use in thermally assisted/thermal information processing and control.

INTRODUCTION TO THE INVENTION

The present invention builds upon concepts and technologies disclosed in the cross-referenced inventions listed above. In particular, one important concept that is treated in many of the embodiments disclosed in the cross-referenced inventions concerns that of developing and delivering the power of an input energy source to a media as an ancillary step for writing and/or erasing and/or reading information stored on the media. As developed in detail below, the present invention discloses an adjustable heat flux mechanism that can be used to complement and enhance the utility and efficiency of the cross-referenced inventions, but is not limited or circumscribed by these cross-referenced inventions.

SUMMARY OF THE INVENTION

Our work today builds upon the techniques disclosed throughout the cross-referenced inventions. In particular, we today disclose a novel assembly comprising an adjustable heat flux mechanism which can provide an advantageous utility for inventions otherwise nominally concerned with developing and delivering the power of an input energy source to a media as an ancillary step for writing and/or erasing and/or reading information stored on a media.

The advantages asserted in favor of the present invention may be appreciated by first setting in apposition conventional techniques for delivering the power of an input energy source to a media. Note that for this purpose we choose an illustrative technique comprising thermally assisted magnetic recording. Accordingly, conventional techniques for thermally assisted magnetic recording preferably include a step of locally changing (reducing) the coercivity of a magnetic media by heating a small area of the media. However, we note that while applying the heat to the local area, surrounding areas on the media, i.e., adjacent data tracks, are typically heated as well—a situation which is not desired and may be deleterious since this has the effect of degrading a stored magnetic information pattern.

To develop this last point, specifically, we note that in a first order of approximation (neglecting the influence of external magnetic fields, see D. Weller and A. Moser "Thermal effect limits in ultrahigh density magnetic recording, IEEE Trans. Mag. 35 (1999) pp4423), the thermal decay of the stored magnetic information can be characterized by a temperature dependent energy barrier $$E_B(T(t)) = K_u(T(t))V$$

with $K_u(T(t))$ as the temperature- (and thus time-) dependent anistropic energy density of the magnetic media, V as the effective volume of the media grains, and T as the absolute temperature. For simplicity, we assume that V is independent of the temperature. We define a time constant $\tau_o$ as the inverse of $f_o$, the thermal attempt frequency, which sets the time scale for temperature assisted magnetization decay (typically $\tau_o \sim 1$ ns). The fraction x of the magnetization which is retained after the time $t_x$ is then given by $$t_x = |\ln x| \tau_o \exp(E_B(T(t))/kT(t))$$

with k as the Boltzmann constant. A typical product specification for a conventional magnetic hard disk drive at the maximum storage temperature (of typically 55° C.) would e.g. require that after 10 years the magnetic readback signal is decayed by no more than 5%, i.e. x=0.95 and $t_{0.95}$=10 yrs.=$3 \cdot 10^8$s. FIG. 1 shows as an example for a typical longitudinal magnetic recording media in semilogarithmic plot the allowed exposure time $t_x$ (for a given fraction x) as a function of T. FIG. 1 underlines the importance of controlling the end temperature of the media.

In any thermally assisted/thermal recording the absolute temperature of the media is a function of time, as it is heated by a recording head. The details of the temperature profile depend on various details of the thermal recording method, such as shape and size of the heat spot, velocity of the media relative to the head, etc., as well as the base temperature of the media or disk. Knowing T(t) in an adjacent track, we can simply obtain the numbers of allowed write cycles ($\#_{allowed}$) before the stored information pattern is severely degraded, i.e. the signal decayed by a fraction x, by integrating over the total exposure time for one cycle:

$$\#_{allowed} = \frac{1}{\int_0^{cycle} 1/t_x(T(t))dt}$$

Typical product specifications e.g., for a high-end hard disk drive for server applications require that the magnetic information in any given data track be reliably stored for more than $10^6$ write cycles in adjacent data tracks, which imposes a strict constraint on thermal and thermally assisted recording methods.

For the understanding of the new capabilities of the present invention and its importance it is essential to realize that the temperature, to which a thermal recording head heats the media or disk, depends in most cases (e.g., if the head and the media are in direct contact) on the relative temperature difference between head and disk while the numbers of allowed write cycles as well as the writeability of the media depends on the absolute temperature.

The above statements are easily understood by looking at a specific example: Magnetic storage devices are typically specified to work between 5° C. and 55° C. Let us assume for our thermally assisted magnetic recording system a target write temperature of 155° C., i.e., the temperature at which the media magnetization is sufficiently lowered from its room temperature value to become writeable by the magnetic recording head. At the lowest specified operating temperature of 5° C., the recording head would therefore have to provide sufficient thermal energy to heat the media by 150 K to reach the write temperature. Detailed finite element modeling yields the thermal profiles in the adjacent track (i.e., 310 nm away from the track center) as a function of time per write cycle (for a 1.0×0.1 $\mu m^2$ heater on a spinning (@ 10 m/s) (1 W/mK, 2.5 g/cm$^3$, 0.25 J/g K) with 75 nm thick recording layer (10 W/mK, 7 g/cm$^3$, 0.4 J/g K)). As it can be inferred from FIG. 2, the peak temperature reached in the adjacent track is 411 K (138° C.) for an operating temperature 278 K (5° C.), which results in combination with the data in FIG. 1 and the above equations into $4.1 \cdot 10^6$ allowed write cycles. This is more than sufficient for high-end storage applications. However, the situation is quite different for a base temperature of 55° C. The same power setting for the recording head would heat the media in the adjacent track to 461 K (188° C.) (see FIG. 2). While heating above the write temperature does not necessarily interfere with the write process (i.e., if the bit dimensions are defined by a magnetic field), it unavoidably results in higher adjacent track heating, which in turn can reduce the numbers of allowed write cycles dramatically, in the given example to $1.2 \cdot 10^2$. This very strong dependence of the numbers of allowed write cycles on the absolute temperature is due to the fact that the temperature is in the exponential term of the above equations. We note that this strong temperature dependence of the thermal decay of stored information is by no means specific to magnetic storage, but is typical for a wide variety of storage materials such as e.g., phase-change media, where the decay of the stored information is governed by an Arrhenius-type behavior.

The present invention is cognizant of the problem of excess heating of adjacent tracks, and discloses a solution to the problem by way of measuring and/or inferring the temperature of the disk and then adjusting the power incident on the media accordingly. As a result, the thermal/thermally assisted recording can realize a constant end temperature of the media (see FIG. 2), which greatly enhances the number of allowed write cycles (see specifically in FIG. 2 for 55° C. operating temperature from $1.2 \cdot 10^2$ to $1.26 \cdot 10^6$) and therefore extends greatly the capabilities of thermal/thermally assisted recording methods and assemblies.

Accordingly, in a first aspect of the present invention, we disclose an assembly comprising:

1) a temperature sensing element for measuring/inferring the temperature of a media; and 2) a controller responsive to the temperature sensing element and capable of inputting power to a media based on a measured/inferred temperature of the media.

In a second aspect of this invention, we disclose an assembly comprising:

1) a directed energy source for heating a media;

2) a temperature sensing element for measuring/inferring the temperature of the media; and 3) a controller responsive to the temperature sensing element and capable of inputting power to a media based on a measured/inferred temperature of the media.

BRIEF DESCRIPTION OF THE DRAWING

The invention is illustrated in the accompanying drawing (not drawn to scale), in which.

DETAILED DESCRIPTION OF THE PRESENT INVENTION

Figure 1:
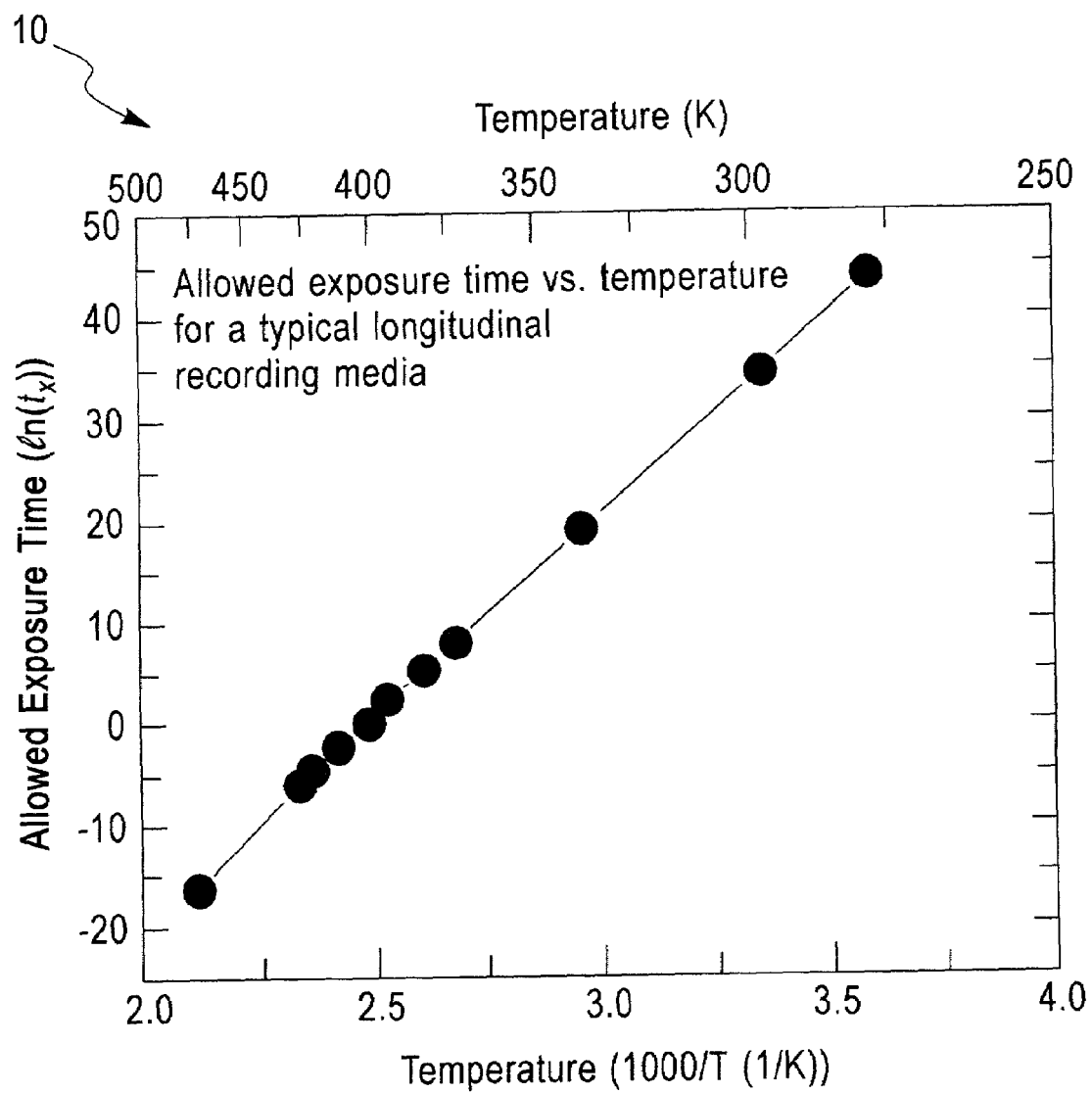
FIG. 1 shows an example for a typical longitudinal magnetic recording media in semilogarithmic form an allowed exposure time $t_x$ (for a given fraction x) as a function of the absolute temperature (T)
Figure 2:
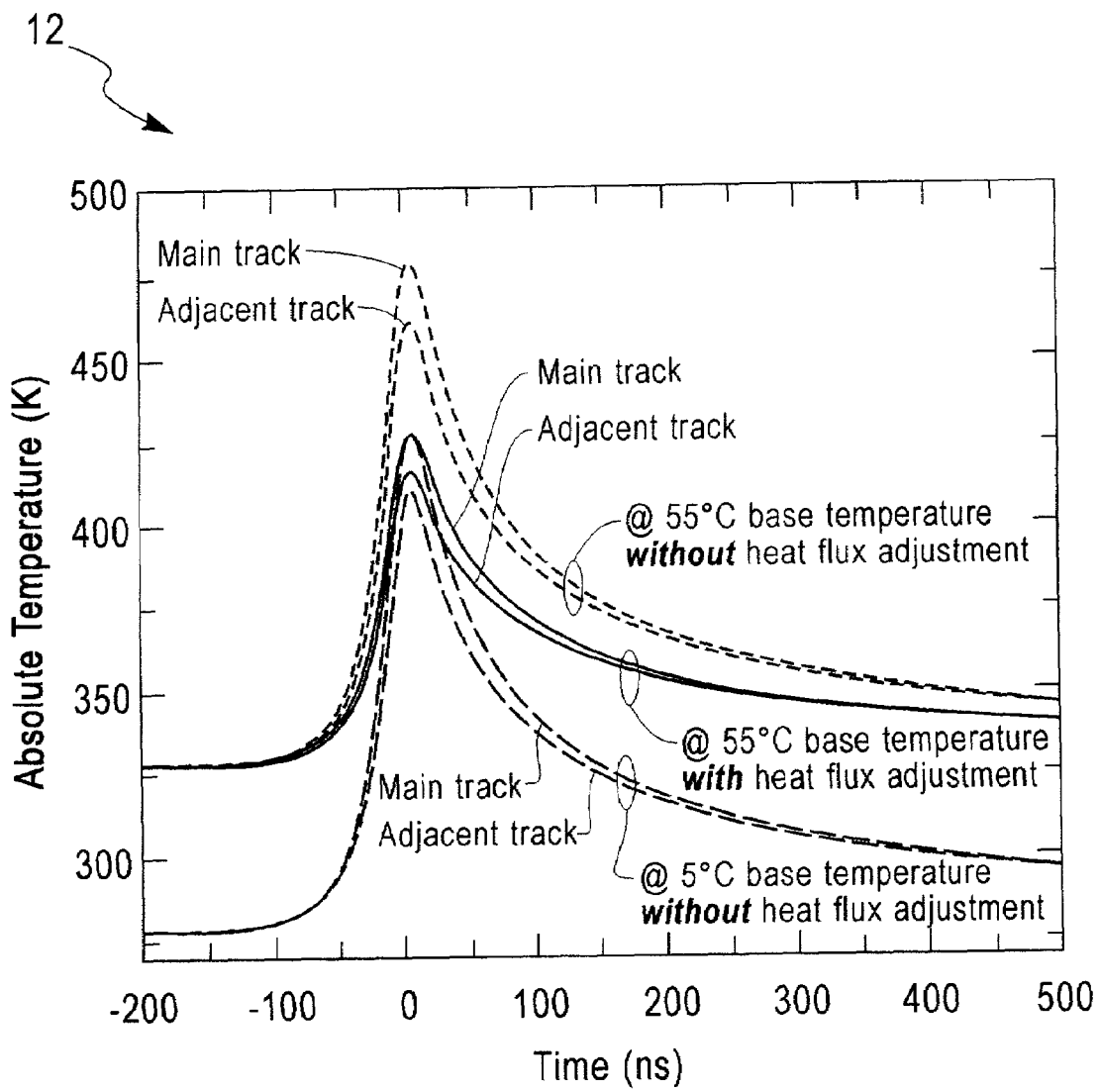
FIG. 2 shows specific temperature profiles in an adjacent track (i.e., 310 nm away from the track center) as a function of time per write cycle (for a 1.0×0.1 $\mu m^2$ heater on a spinning (@ 10 m/s) disk (1 W/mK, 2.5 g/cm$^3$, 0.25 J/g K) with 75 nm thick recording layer (10 W/mK, 7 g/cm$^3$, 0.4 J/g K))
Figure 3:
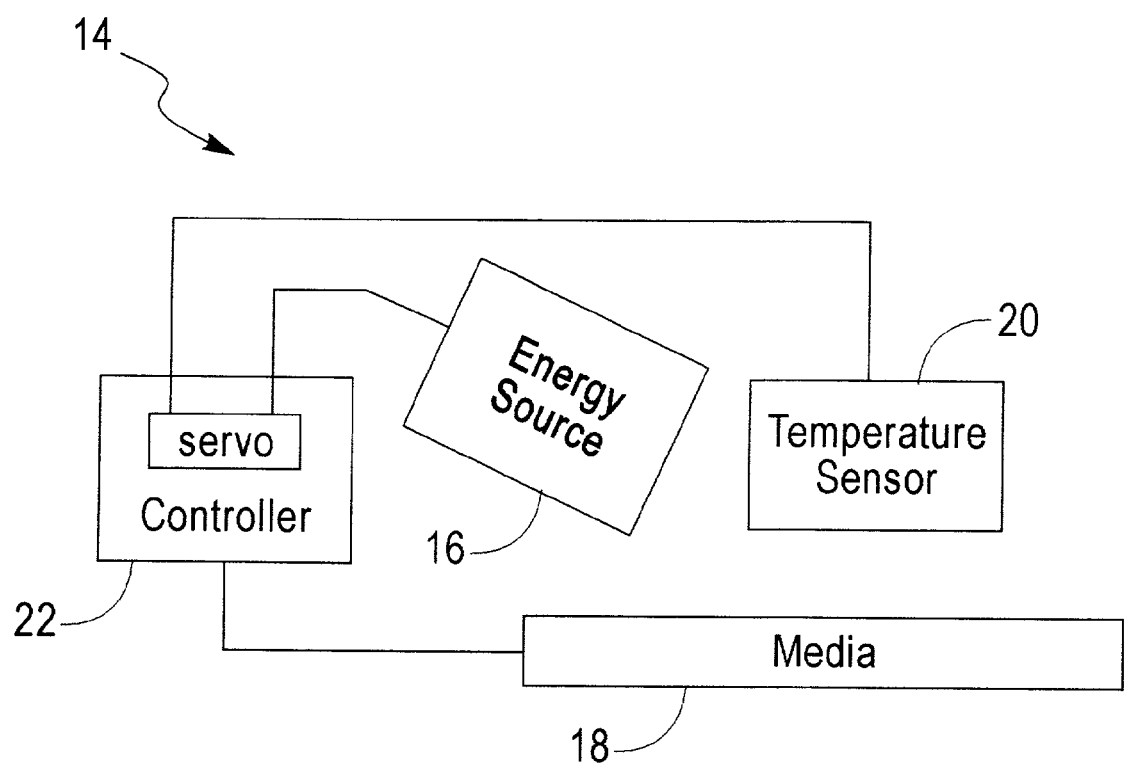
FIG. 3 illustrates a generalized assembly of the present invention.

Attention is now directed to FIG. 3 which illustrates a generalized assembly (14) which can be built in accordance with the present invention. In particular, the assembly (14) includes:

1) a directed energy source (16) for heating a media (18);

2) the media (18) suitable for thermal/thermally assisted recording;

3) a temperature sensing element (20) for measuring/inferring the temperature of the media (18); and 4) a controller (22) responsive to the temperature sensing element (20) and capable of inputting power to the media (18) based on a measured/inferred temperature of the media.

We now provide particulars on each of the assembly (14) elements.

Directed energy source: The energy source (16) can include any kind of energy which can effect heating of the media (18) including electrons, ions, phonons, plasmons, and excitons. As examples, the energy source may comprise a focused laser beam, a thermal heater (YOR920010113, YOR920010062) or a near-field optical source (YOR9-2000-0180). The thermal heater can be in contact or non-contact. It may conduct the heat in the far-field as well as the near-field.

Media: In principle, any kind of storage media (18) can be utilized ranging from phase-change (such as GeSbTe, GaSb, InSb, AgInSbTe, etc.) to magnetic recording media. Potential magnetic recording media range from longitudinal recording media used in today's magnetic storage devices (CoPtCrXY-based materials(X, Y=B, Nb, Ta, ... )) (see for example, M. F. Doemer, K. Tang, T. Arnoldussen, H. Zeng, M. F. Toney, and D. Weller, "Microstructure and thermal stability of advanced longitudinal media", IEEE Trans. Mag., vol. 36, January 2000, p43), over multilayer media proposed for perpendicular magnetic recording (CoPt, CoPd), to ultrahigh anisotropy materials (FePt L10 phase and similar materials (see for example, D. Weller, A. Moser, L. Folks, M. E. Best, W. Lee, M. F. Toney, M. Schwickert, J. -U. Thiele, and M. F. Doerner, High Ku Materials Approach to 100 Gbits/in$^2$", IEEE Trans. Mag., vol. 36, January 2000, p10))

Temperature sensor element: One purpose of the temperature sensor element (20) is to measure/infer the temperature of the media (18) at the location where the thermal/thermally assisted recording takes place. In principle, the temperature sensing element (20) can include any kind of temperature sensing element comprising thermocouples, thermistors, or piezoelectrics. Importantly, the temperature measurement should allow one to derive an accurate estimation of the media or disk temperature. As an example, a piezoelectric film can be used to measure the black body radiation from the media or disk. This film may be embedded in the recording head. As another example, several thermocouples throughout the recording device can be used to infer the disk or media temperature taking the different thermal time constants into account. Another option, suitable specifically for magnetic recording, is to infer the temperature from the resistance of the coils or the GMR-sensor.

Controller/Control mechanism: The purpose of the controller/control mechanism (22) preferably extends to a threefold capability. First, the controller preferably coordinates a mutual positioning between the directed energy source (16) and the media (18). It is preferred that this controller (22) functions so that the coupling between energy source and controller subsumes at least one portion of the thermal near-field. To this end, a suitable controller/control mechanism may use an actuator, which may be selected from the group consisting of a piezo-electric actuator, an electromagnetic actuator, a magnetic-strictive actuator, a thermal-mechanical actuator, and, an air-bearing mechanism. Second, the controller preferably comprises a servo loop (e.g., integrator), which can feedback on the energy source, thereby adjusting for temperature gradients of the disk or media. For example, to this end, the supply current to a resistive thermal heater may be adjusted in accordance to the temperature sensing element (20). Or, alternatively, one may adjust the fly height between the media and a thermal recording head in accordance with the temperature sensing element (20). Finally, the controller can be used to enable the thermal/thermal-assisted recording process (writing and/or erasing) by using an information signal.

What is claimed:

1. An assembly suitable for thermally assisted/thermal information processing control, the assembly comprising:
    a temperature sensing element comprising a piezoelectric film for measuring the blackbody radiation of a medium to produce measurement information; and,
    a controller responsive to measurement information including a temperature of the medium from the temperature sensing element and inputting power to a medium based on the temperature of the medium.

2. The assembly of claim 1 wherein the temperature sensing element is configured to measure the blackbody radiation of the medium at a location where thermally assisted/thermal information processing occurs.

3. The assembly of claim 1 wherein the piezoelectric film is embedded in a recording head of a disk storage device and is configured to measure the blackbody of a disk as the medium.

4. The assembly of claim 1 wherein the controller is configured to control an adjustable heat flux mechanism to input power to the medium based on the measured temperature of the medium.

5. The assembly of claim 1 wherein the controller comprises a servo loop which feeds on energy output by an energy source to adjust the temperature of the medium.

6. The assembly of claim 1 wherein the controller is configured to enable thermally assisted/thermal information processing, which includes at least one of writing and erasing, by using an information signal.

7. The assembly of claim 1 wherein the controller is configured to coordinate a mutual positioning between an energy source to input power to the medium and the medium.

8. The assembly of claim 7 wherein the controller is configured to coordinate the mutual positioning between the energy source to input power to the medium and the medium so that a coupling between the energy source and the controller subsumes at least a portion of a thermal near-field.

9. The assembly of claim 7 wherein the controller comprises an actuator to coordinate the mutual positioning.

10. The assembly of claim 9 wherein the actuator is selected from the group consisting of a piezoelectric actuator, an electromagnetic actuator, a magnetic-strictive actuator, a thermal-mechanical actuator, and an air-bearing mechanism.

11. An assembly comprising:
    a directed energy source configured to heat a medium;
    a temperature sensing element comprising a piezoelectric film for measuring the blackbody radiation of a medium to produce measurement information; and,
    a controller responsive to measurement information including a temperature of the medium from the temperature sensing element and inputting power to a medium based on the temperature of the medium.

12. The assembly of claim 11 wherein the temperature sensing element is configured to measure the blackbody radiation of the medium at a location where thermally assisted/thermal information processing occurs.

13. The assembly of claim 11 wherein the piezoelectric film is embedded in a recording head of a disk storage device and is configured to measure the blackbody of a disk as the medium.

14. The assembly of claim 11 wherein the controller is configured to control an adjustable heat flux mechanism to input power to the medium based on the measured temperature of the medium.

15. The assembly of claim 11 wherein the controller comprises a servo loop which feeds on energy output by the directed energy source to adjust the temperature of the medium.

16. The assembly of claim 11 wherein the controller is configured to enable thermally assisted/thermal information processing, which includes at least one of writing and erasing, by using an information signal.

17. The assembly of claim 11 wherein the controller is configured to coordinate a mutual positioning between the directed energy source to input power to the medium and the medium.

18. The assembly of claim 17 wherein the controller is configured to coordinate the mutual positioning between the directed energy source to input power to the medium and the medium so that a coupling between the directed energy source and the controller subsumes at least a portion of a thermal near-field.

19. The assembly of claim 17 wherein the controller comprises an actuator to coordinate the mutual positioning.

20. The assembly of claim 19 wherein the actuator is selected from the group consisting of a piezo electric actuator, an electromagnetic actuator, a magnetic-strictive actuator, a thermal-mechanical actuator, and an. air-bearing mechanism.

* * * * *